United States Patent [19]
Pilone et al.

[11] Patent Number: 6,122,061
[45] Date of Patent: *Sep. 19, 2000

[54] OPTICAL APPARATUS FOR MEASURING THE DISTANCE OF AN OBJECT AND PROCESS FOR MEASURING THE DISTANCE OF AN OBJECT FROM AN OPTICAL MEASURING APPARATUS

[75] Inventors: Ciro Adelmo Pilone, Bologna; Gianfranco Righi, Modena, both of Italy

[73] Assignee: Datalogic S.p.A., Bologna, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/996,195

[22] Filed: Dec. 22, 1997

[30] Foreign Application Priority Data

Dec. 24, 1996 [EP] European Pat. Off. ............... 96830652

[51] Int. Cl.⁷ .................................................... G01B 11/14
[52] U.S. Cl. ........................... 356/375; 356/373; 356/372
[58] Field of Search .................................. 356/3.01, 3.02, 356/3.03, 3.06, 4.01, 373, 375; 250/234

[56] References Cited

U.S. PATENT DOCUMENTS

| | | | |
|---|---|---|---|
| 5,113,080 | 5/1992 | Leu et al. | 356/1 |
| 5,471,050 | 11/1995 | Nishimoto et al. | 356/4.01 |
| 5,608,211 | 3/1997 | Hirono et al. | 356/376 |

FOREIGN PATENT DOCUMENTS

| | | | |
|---|---|---|---|
| 06042964 | 2/1994 | European Pat. Off. | G01C 3/06 |
| 3709614 | 10/1988 | Germany . | |
| 05322559 | of 1993 | Japan . | |
| 0642964 | of 1994 | Japan . | |
| 0763511 | of 1995 | Japan . | |
| 0798223 | of 1995 | Japan . | |
| 0894922 | of 1996 | Japan . | |

*Primary Examiner*—Frank G. Font
*Assistant Examiner*—Roy M. Punnoose
*Attorney, Agent, or Firm*—Sughrue, Mion, Zinn, Macpeak & Seas, PLLC

[57] ABSTRACT

The present invention concerns an optical apparatus for measuring the distance of an object and characterized in that it comprises a case, a first converging lens housed in the case, a light source housed in the case and acting through the first converging lens to illuminate in a direction of illumination an object, a second converging lens housed in the case in a position such as to collect, in a direction angularly deviated with respect to the illumination direction, a light beam diffused by the illuminated object, detection means housed in the case in a position such as to collect the light beam diffused by the object illuminated and penetrating into the case through the second converging lens, with said light beam being collected on detection means from the second converging lens at a point of incidence having a position varying as a function of the distance of the object, with the detection means being capable of generating two electrical signals of different magnitude depending on the point of incidence of the diffused light beam coming from the object, and processing means for electrical signals generated by the detection means and capable of calculating a numerical value of the measured distance.

12 Claims, 4 Drawing Sheets

OPTICAL APPARATUS FOR MEASURING THE DISTANCE OF AN OBJECT AND PROCESS FOR MEASURING THE DISTANCE OF AN OBJECT FROM AN OPTICAL MEASURING APPARATUS

BACKGROUND OF THE INVENTION

The present invention relates to an optical apparatus for measuring the distance of an object and also to a process for measuring the distance of an object from an optical measuring apparatus.

DESCRIPTION OF THE RELATED ART

In many technical fields measuring the distance of an object from a measuring apparatus is of great utility if not fundamental in some cases.

Consider for example all the machining operations where it is necessary to know the distance of the surface to be machined from the machine for correct positioning of the tools and/or exact scheduling of the machine; or all those cases in which knowledge of the distance permits setting of instruments for optimization of processes (e.g. in the area of optics and photography where the distance parameter is closely linked to focusing problems.

Optical apparatuses capable of measuring the distance from an object are known. For example, U.S. Pat. No. 5,483,051 describes bar code readers equipped with several lasers each of which is suited for focusing on an object positioned at a certain distance from the measuring apparatus within a reading range.

These apparatuses cooperate with appropriate systems (often complex and costly) for the processing and control of light signals or appropriate signals generated by the light signals and capable of providing for its correct focusing depending on the position of the object in such a manner as to produce in conclusion information closely correlated with the distance of the object from the optical measuring apparatus.

The technical problem underlying the present invention is to conceive a device which would be an alternative to those of the prior art and capable of measuring with a high degree of accuracy and relative construction simplicity the distance of an object from this device.

BRIEF SUMMARY OF THE INVENTION

In a first aspect the present invention concerns an optical apparatus for measuring the distance of an object and characterized in that it comprises:

a case a first converging lens housed in the case, a light source housed in the case and active through the first converging lens to illuminate an object in one illumination direction, a second converging lens housed in the case in a position to collect, in an angularly deviated direction with respect to the illumination direction, a beam of light diffused by the illuminated object, detection means housed in the case in a position to collect the light beam diffused by the illuminated object and penetrating the case through the second converging lens, with the light beam being collected on the detection means by the second converging lens at a point of incidence having a position on the detection means variable as a function of the distance from the object, and with the detectors means being capable of generating two electrical signals of different magnitude depending on the point of incidence of the diffused light beam coming from the object, and processing means for the electrical signals generated by the detection means and capable of calculating a numerical value of the measured distance.

A device of this type permits measuring the distance of an object by implementing a detection system, capable of converting the light signals into equivalent electrical signals, by an optical triangulation system capable of connecting univocally the distance parameter with the angle of deviation parameter between the diffused light beam collected by the second lens and the light beam directed onto the object. Since the electrical signals generated are a function of the position of incidence of the diffused light beam coming from the illuminated object, and the position being a function of the deviation angle and consequently of the distance of the object, it is possible to find at output the exact numerical value of the distance measured by means of simple mathematical processing of the electrical signals generated by the detection means.

Preferably the first converging lens and the second converging lens are positioned side by side along a plane substantially parallel to the plane supporting the object. In this manner it is possible to collect through the second converging lens the greater part of the light beam emitted through the first converging lens and diffused by the illuminated object to avoid waste of power.

Preferably the light source is positioned in a position such as to generate a light beam having its axis perpendicular to the plane of the first converging lens. In this manner it is possible to collect through the first converging lens substantially the entire light beam emitted by the light source to avoid waste of power.

Preferably the electrical signals generated by the detection means are two electrical currents. This allows applying the following steps of processing of the electrical signals by using relatively simple and widely known instruments and systems.

Preferably the processing means comprise a processing circuit for adjusting the quantity of light emitted by the light source depending on the quantity of incident light on the detection means.

The electrical signals generated by the detection means and subsequently processed by the processing means will contain, superimposed on a significant signal component, a noise component linked exclusively to the type of processing and to the physical characteristics of the photosensitive element illuminated. The accuracy of the measuring system will then depend exclusively on the S/N (significant signal/noise) ratio and hence on the quantity of optical signal returning onto the processing means which is a function of the distance and of the reflectivity of the photosensitive object illuminated. The developed regulation system for the emission allows adjusting the value of the emission and optimizing the S/N ratio while holding it in a preset range of values. In this manner a certain minimum S/N value is ensured but the possibility of having an excess of received signal (caused by an increase in the reflectivity of the illuminated object as e.g. in the case of a white body positioned at a minimum distance) which would lead to saturation of the system is also avoided.

Preferably the processing circuit capable of adjusting the light emission on the basis of the quantity of incident light is active only when the sum of the electrical signals generated does not fall within a preset value range. In this manner control of the S/N ratio merely involves addition of the electrical signals generated so as to have a control signal proportioned to the reflectivity of the illuminated object.

Preferably the processing circuit comprises an analog processing and drive block comprising at least two comparators, a counter, a first transistor and a plurality of electrical resistances arranged in parallel.

Alternatively, the processing circuit comprises a digital processing and drive block comprising an analog/digital converter, a PWM, a low-pass filter, a switch and a second transistor all cascaded together.

It is thus possible to provide an analog or digital solution to the problem of control of the signal quantity emitted by the light source by preparing circuits having well known electrical components.

Preferably the detection means include a Position Sensitive Detector (PSD). This component has the peculiarity of emitting at its ends two currents of different intensity depending on the position in which it is struck by a light ray.

In a second aspect the present invention concerns a process for measuring the distance of an object from the optical apparatus as above mentioned and characterized in that it provides for:

positioning the object in front of the first converging lens,
illuminating the object with a light beam coming from the light source through the first converging lens,
collecting on the detection means the light diffused by the illuminated object and penetrating the case through the second converging lens at a point of incidence having variable position on the detection means depending on the distance of the object,
generating two electrical signals of differing magnitude depending on the position of incidence on the detection means of the diffused light beam coming from the object, and
amplifying and processing the electrical signals generated by the detection means in such a manner as to calculate the numerical value of the measured distance.

Preferably the apparatus comprises a processing circuit comprising a processing block for control of the light source and capable of cooperating with the processing means to adjust the quantity of light emitted by the light source depending on the quantity of incident light on the detection means in accordance with the following steps:

performing the sum of the electrical signals generated by the detection means and division of one of the two signals by their sum to obtain a numerical value representing the electrical signals,
verifying whether this sum falls within a preset value range and proceeding in this case to measuring the distance, and
if the sum does not fall within the preset value range, adjusting the current circulating in the light source control block in such a manner as to bring back the sum of the electrical signals generated to a numerical value falling within the preset range.

Measuring the distance of the object from a measuring apparatus is then performed in accordance with a process which is relatively simple and accurate and these are qualities possessed by instruments and apparatuses widely known in the optical and automation sector.

Preferably the processing block is digital, capable of calculating from time to time the sum of the electrical signals generated and of adjusting the emission of the light source, and performs the following operations:

comparing the sum of the electrical signals with the maximum and minimum values of the preset value range and, respectively if the sum found is above or below the range, calculating a new emission value which is a function of the arithmetic mean of the sum and the minimum or maximum value of the preset range,
on the basis of the new calculated emission value, processing a new electrical signal which adjusts the current circulating in the light source control block so as to generate a light signal of a different magnitude and hence electrical signals of different magnitude from the previous ones, and
repeating the comparison of the sum of the new electrical signals with the maximum and minimum values of the range until there is found a sum of the electrical signals generated falling within the preset value range.

The use of a digital processing block makes possible preparing a binary algorithm for seeking a S/N ratio within the preset value range. This kind of seeking ensures minimum time for reaching the sought value.

Further characteristics and advantages of an apparatus and process in accordance with the present invention are clarified by the following description of a preferred embodiment thereof given with reference to the annexed drawings.

DETAILED DESCRIPTION OF THE INVENTION

Figure 1:
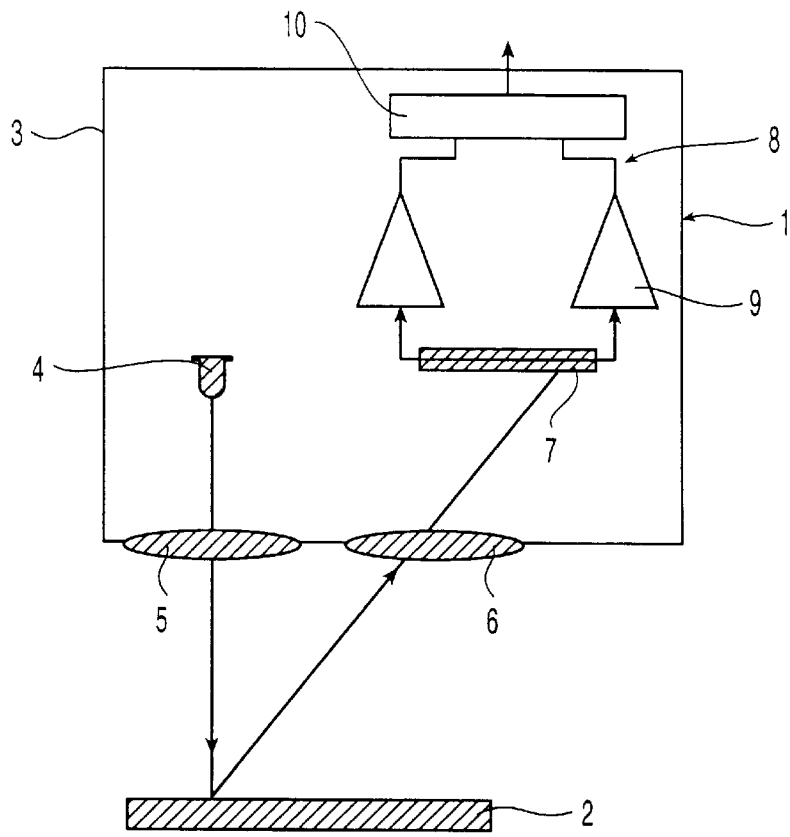
FIG. 1 shows a diagram of an optical apparatus in accordance with the present invention.
Figure 2:
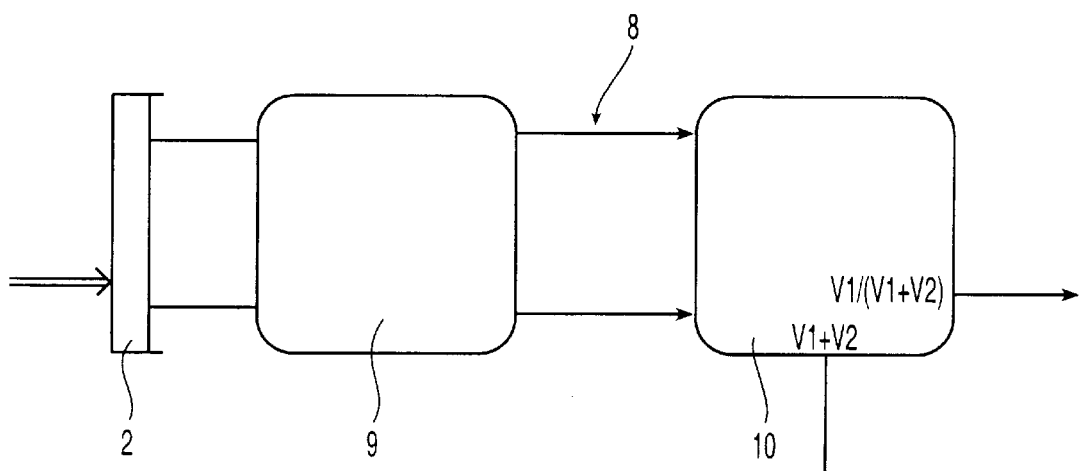
FIG. 2 shows a block diagram of the processing circuit of the apparatus of FIG. 1.
Figure 3:
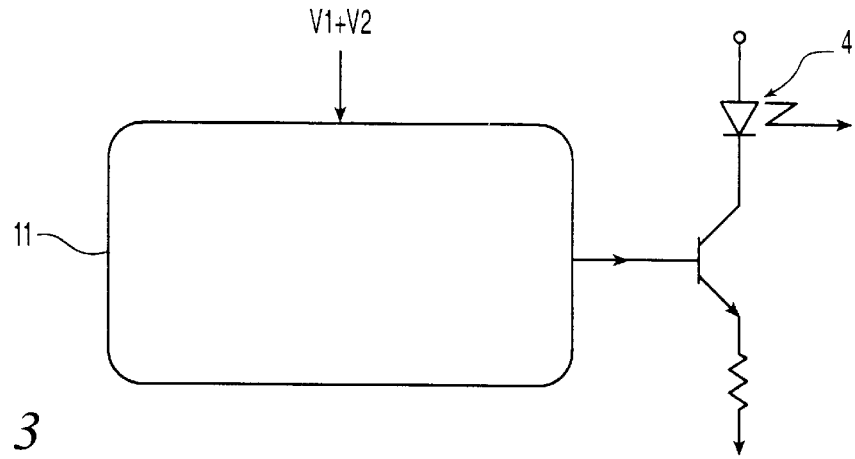
FIG. 3 shows schematically the operation of the processing and drive block (analog or digital) cooperating with the processing circuit of FIG. 2.
Figure 4:
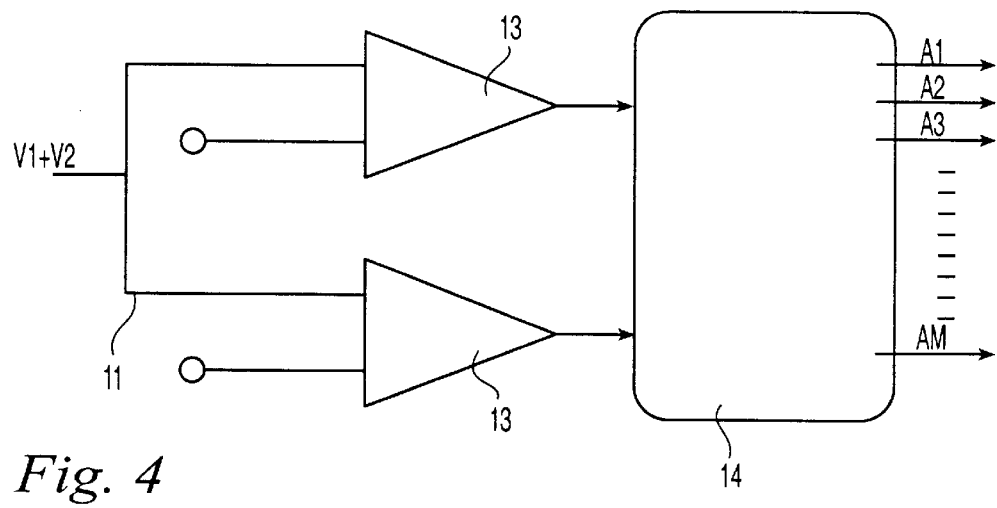
FIG. 4 shows schematically the electrical circuit of the analog processing block of FIG. 3.

In these FIGS reference number 1 shows schematically an optical apparatus for measuring the distance of an object 2. The apparatus 1 displays in a case 3 a light source 4. On a lateral surface of the case 3 are housed, substantially along the same plane, a first converging lens 5 and a second converging lens 6. The light source 4 is positioned in such a manner as to generate a light beam having its axis perpendicular to the optical plane of the lens 5.

The first lens 5 and the second lens 6 are positioned side by side in such a manner that the lens 6 collects the light beam diffused by the object 2 in a direction angularly deviated with respect to the light beam emitted by the light source 4 and directed by the first lens 5 onto the object 2.

In the case 3 are provided detection means 7 positioned above the second lens 6 in such a manner as to be able to collect at a certain point, variable depending on the measured distance, the diffused light beam penetrating the case 3 through the second lens 6. The detection means 7 are electrically connected to processing means 8 and convert the received light signals into two electrical signals, specifically electrical currents, of differing magnitude depending on the position of the point of incidence of the diffused light beam coming from the object. In a preferred configuration the detection means consist of a Position Sensitive Detector (PSD).

The processing means 8 comprise a first amplification circuit 9 for the two electrical signals generated by the detection means 7, a successive processing circuit 10 of the amplified electrical signals and a processing and drive block 11 acting on the light source 4 in such a manner as to adjust its emission.

Figure 5:
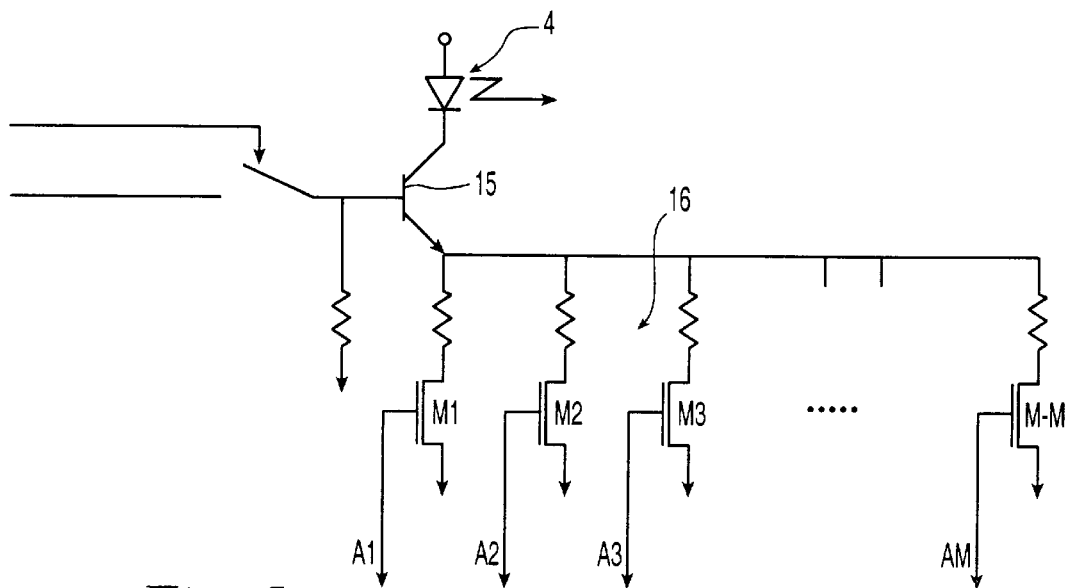
FIG. 5 shows schematically the emission control electrical circuit cascaded with the analog processing and drive block.
Figure 6:
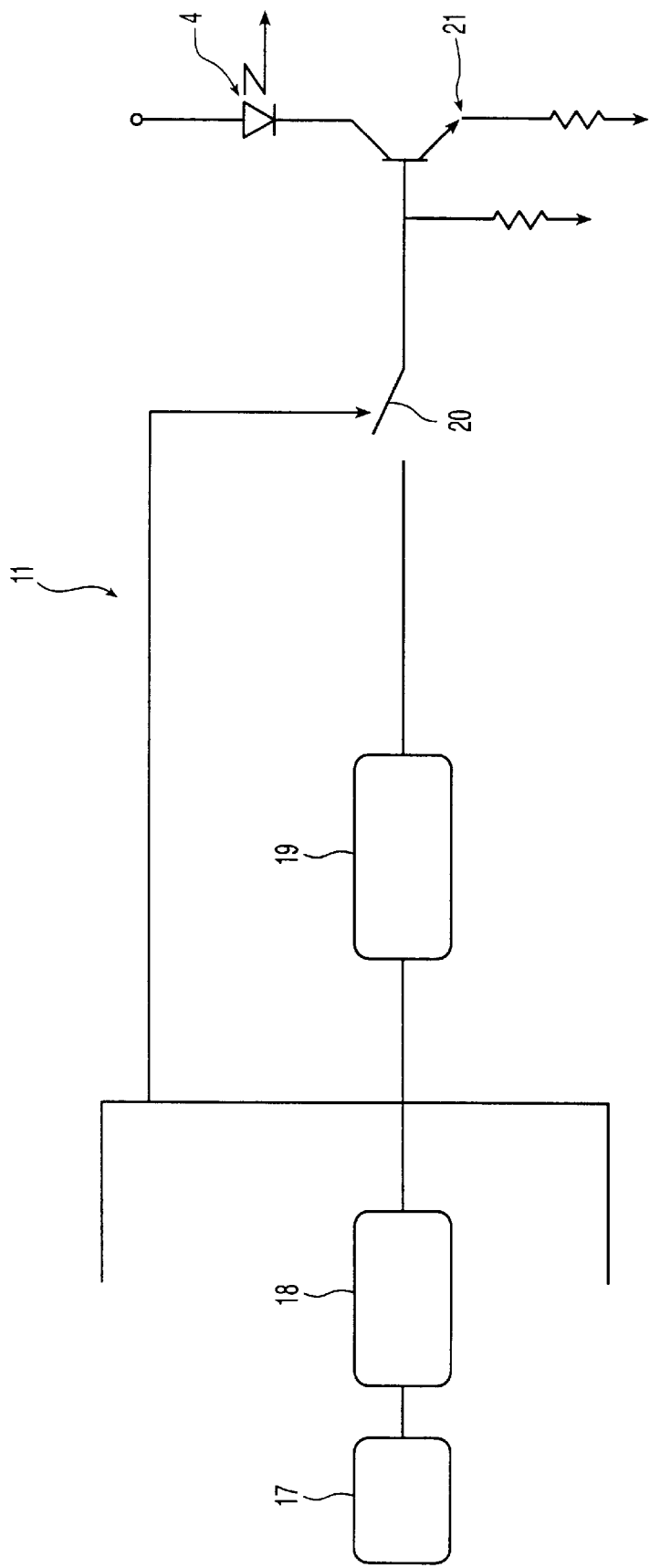
FIG. 6 shows schematically the emission control electrical circuit cascaded with the digital processing and drive block.

The processing and drive block 11 can be alternatively the analog or digital type. If it is expected to use an analog processing and drive block 11 it will comprise in cascade two comparators 13, a counter 14 with A1–AM outputs, a first transistor 15 and a plurality of electrical resistances 16 arranged in parallel (FIG. 5) with in series switches M1–MM controlled by the outputs A1–AM of the counter with thermometer 14. If it is expected to use a digital processing and drive block 11 it will comprise in cascade an analog/digital converter 17, a Pulse Width Modulation (PWM) 18, a low-pass filter 19, a switch 20 and a second transistor 21 (FIG. 6).

The optical apparatus 1 operates in the manner described below.

The object 2 of which it is desired to measure the distance is before the apparatus 1 in front of the first converging lens 5. The light beam emitted by the light source 4 is directed through the first lens 5 onto the object 2 and part of the light beam diffused by the object 2 is collected through the second converging lens 6 at a particular point of the detection means 7 in a direction angularly deviated with respect to the direction of illumination of the light source 4. As the distance of the object 2 from the apparatus 1 varies, the angle of deviation of the diffused light beam will vary with respect to the emitted light beam and consequently the position of the point of incidence of the diffused light beam on the detection means 7 will vary.

The detection means 7 convert the received light signal in two electrical currents of different magnitude depending on the position of the point of incidence of the diffused light beam coming from the object 2. These currents are amplified in the amplification circuit 9 and are sent to a processing circuit 10 which performs the sum of the received electrical currents and division of one of the two currents by that sum to calculate a numerical value representing the electrical signals generated and hence the distance of the object 2.

The calculated sum which for equal light emitted by the source 4 is proportionate to the reflectivity of the object 2 is sent to the processing and drive block 11 which compares it with the end values of the preset range.

If the calculated sum is within the range the processing and drive block 11 acting on the light source 4 for adjusting the intensity of the signal emitted is not activated and the processing circuit 10 calculates the distance.

Figure 7:
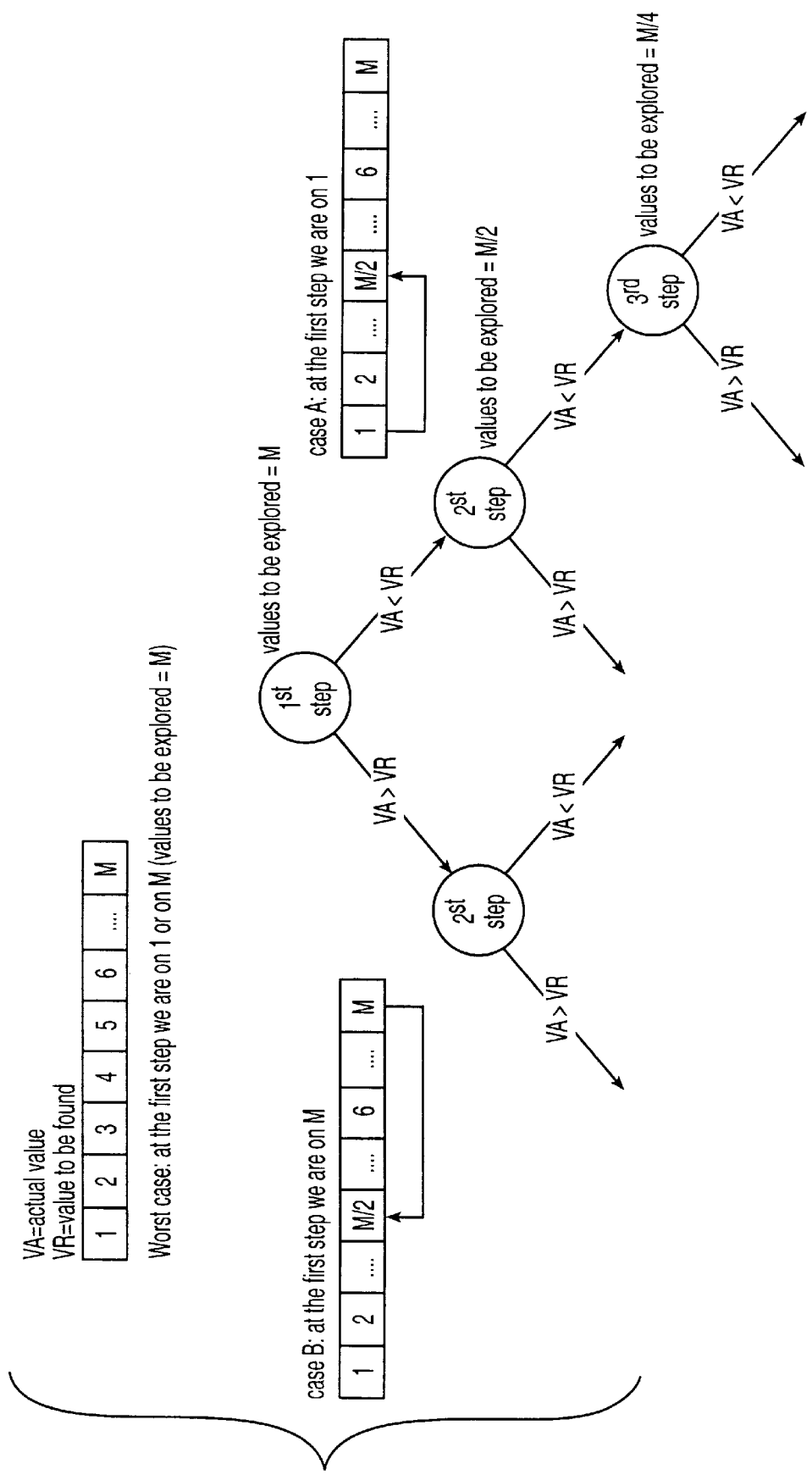
FIG. 7 shows schematically the steps performed by the binary search algorithm prepared in the digital processing and drive block of FIG. 3.

But if the calculated sum is above or below the range the processing circuit 10 does not calculate the distance but calculates a new emission value which will be respectively a function of the arithmetic mean of the calculated sum and the minimum or maximum values of the preset range (FIG. 7 if there is provided a digital processing block).

On the basis of the new calculated value the current circulating in the light source 4 will be changed through the electrical circuits of the processing and drive blocks of FIGS. 3, 4, 5 and 6 in such a manner as to generate a light signal of a different magnitude and hence electrical signals in the detection means 7 of a different magnitude from the previous ones.

The above sequence of operations is repeated until the value found by summing the electrical signals generated in the detection means 7 falls within the preset value range. Only in this condition the processing circuit 10 calculate the measured distance.

Specifically if a digital processing block is provided, the control of the current circulating in the light source 4 is performed by controlling the duty cycle of the signal output by the PWM 18.

Assuming search for the correct emission value in M possible values of the duty cycle for the signal output by the PWM 18 and hence in M different values of the emission signal, with the above mentioned binary search algorithm (FIG. 7) there will be an access time to the correct value proportionate to $\log_2 M$, which is less than there would be with sequential search where access time is proportionate to M.

It is noted that the above mentioned apparatus and measuring process go beyond the problem of focusing on the object with the variation in its distance from the measuring apparatus thanks to the use of a PSD as the detection system. The need to focus on the object is replaced in this case by the requirement to have a clear and focused signal on the PSD. Nevertheless the presence of any out of focus signal caused by a change in the distance of the object from the measuring apparatus will generate on the PSD a pair of electrical signals understood this time as signals resulting from the sum of the various signals generated by the various infinitesimal portions of illuminated PSD.

What is claimed is:

1. Optical apparatus (1) for measuring the distance of an object (2), comprising:
    a case (3),
    a first converging lens (5) housed in the case (3),
    a light source (4) housed in the case (3) and acting through the first converging lens (5) to illuminate an object (2) in one direction of illumination,
    a second converging lens (6) housed in the case (3) in a position to collect, in an angularly deviated direction with respect to the illumination direction, a beam of light diffused by the illuminated object (2),
    detection means (7) housed in the case (3) in a position to collect the light beam diffused by the illuminated object (2) and penetrating the case (3) through the second converging lens (6), with said light beam being collected on the detection means (7) as a function of the distance of the illuminated object (2), with the detection means (7) being capable of generating two electric signals of different magnitude depending on the position of incidence of the diffused light beams coming from the illuminated object (2), and
    processing means (8) for the electrical signals generated by the detection means (7), the processing means being capable of calculating a numerical value of the measured distance only when the sum of the electrical signals generated falls within a preset value range.

2. Apparatus in accordance with claim 1 in which the first converging lens (5) and the second converging lens (6) are positioned side by side along a plane virtually parallel to plane supporting the object (2).

3. Apparatus in accordance with claim 2 in which the light source (4) is positioned in such a manner as to generate a light beam having its axis perpendicular to the plane of the first converging lens (5).

4. Apparatus in accordance with claim 1 in which the electrical signals generated by the detection means (7) are two electrical currents.

5. Apparatus in accordance with claim 1 in which the processing means (8) comprise a processing circuit (10) for adjusting the quantity of light emitted by the light source (4) depending on the quantity of incident light on the detection means (7), said processing circuit being active only when the sum of the electrical signals generated does not fall within the preset value range.

6. Apparatus in accordance with claim 5 in which the processing circuit (10) comprises an analog processing and drive block (11) comprising at least two comparators (13), a counter (14), a first transistor (15) and a plurality of electrical resistances (16) arranged in parallel.

7. Apparatus in accordance with claim 5 in which the processing circuit (10) comprises a digital processing and drive block (11) comprising an analog/digital converter (17), a PWM (18), a low-pass filter (19), a switch (20) and a second transistor (21) all cascaded together.

8. Apparatus in accordance with claim 1 in which the detection means (7) comprise a Position Sensitive Detector (PSD).

9. Process for measuring the distance of an object (2) from the optical apparatus (1) as set forth in claim 1, comprising the following steps:
    positioning the object (2) in front of the first converging lens (5),
    illuminating the object (2) with a light beam coming from the light source (4) through the first converging lens (5),
    collecting on the detection means (7) the light diffused by the illuminated object (2) and penetrating the case (3) through the second converging lens (6) at a point of incidence having variable position on the detection means (7) as a function of the distance of the object (2),
    generating two electrical signals of different magnitude depending on the position of incidence on the detection means (7) as a function of the distance of the object (2),
    generating two electrical signals of different magnitude depending on the position of incidence on the detection means (7) of the diffused light beam coming from the object (2),
    performing the sum of the electrical signals generated by the detection means (7),
    verifying whether said sum falls within a preset value range, and
    only if the sum falls within the range, calculating the numerical value of the measured distance.

10. Process for measuring the distance of an object (2) in accordance with claim 9, comprising the following step:
    if the sum does not fall within the range:
    adjusting magnitude of the light beam so as to bring back the sum of the electrical signals generated to a value falling within the preset range.

11. Process for measuring the distance of an object (2) in accordance with claim 10 and in which the apparatus (1) comprises a processing circuit (10) comprising a processing block (11) for control of the light source (4) and capable of cooperating with the processing means (8) to adjust the magnitude of the light beam emitted by the light source (4) depending on the quantity of incident light on the detection means (7) wherein the step of adjusting magnitude of the light beam includes adjusting the current circulating in the block (11) for control of the light source (4).

12. Process for measuring the distance of an object (2) in accordance with claim 11 in which the digital processing and drive block (11), capable of calculating from time to time the sum of the electrical signals generated and of adjusting the emission of the light source (4), performs the following operations:
    comparing the sum of the electrical signals with the maximum and minimum values of the preset value range and, respectively if the sum found is above or below the range, calculating a new emission value which is a function of the arithmetic mean of the sum and the minimum or maximum value of the preset range,
    on the basis of the new calculated processing emission value, a new electrical signal which adjusts the current circulating in the block (11) for control of the light source (4) so as to generate a light signal of a different magnitude and hence electrical signals of different magnitude from the previous ones, and
    repeating the comparison of the sum of the new electrical signals with the maximum and minimum values of the range until there is found a sum of the electrical signals generated falling within the preset value range.

* * * * *